United States Patent
Cerf et al.

(10) Patent No.: US 8,284,908 B2
(45) Date of Patent: Oct. 9, 2012

(54) SYNCHRONIZING VOICEMAIL AMONG MULTIPLE CLIENT ACCESS POINTS

(75) Inventors: Genevieve Cerf, Groton Long Point, CT (US); Robert C Baruch, Rising Sun, MD (US); Gerald Y Honma, Aiea, HI (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 486 days.

(21) Appl. No.: 12/633,101

(22) Filed: Dec. 8, 2009

(65) Prior Publication Data

US 2011/0135070 A1    Jun. 9, 2011

(51) Int. Cl.
  *H04M 11/00* (2006.01)
  *H04M 1/725* (2006.01)
(52) U.S. Cl. .................... 379/88.18; 455/412.2
(58) Field of Classification Search .... 379/88.17–88.25; 455/412.1–414.1
See application file for complete search history.

(56) References Cited

U.S. PATENT DOCUMENTS

| 6,018,762 | A  | * | 1/2000 | Brunson et al. | 709/206 |
| 2004/0071442 | A1 | * | 4/2004 | Wells | 386/66 |
| 2009/0154667 | A1 | * | 6/2009 | Hao et al. | 379/88.18 |
| 2010/0085961 | A1 | * | 4/2010 | Zhao et al. | 370/352 |
| 2010/0151831 | A1 | * | 6/2010 | Hao et al. | 455/412.2 |

OTHER PUBLICATIONS

"Went Walkabout. Brought back Google Wave.", The Official Google Blog, http://googleblog.blogspot.com/2009/05/went-walkabout-brought-back-go..., May 28, 2009.

* cited by examiner

*Primary Examiner* — Davetta W Goins
*Assistant Examiner* — Mohammad Islam

(57) ABSTRACT

A set of servers connect to a group of voicemail systems and to a group of client access points. The set of servers may receive a request to perform a transaction relating to a voicemail mailbox of a particular voicemail system; cause the transaction to be performed with regard to the voicemail mailbox of the particular voicemail system; and receive a notification that the transaction was performed with regard to the voicemail mailbox of the particular voicemail system. The set of servers may perform synchronization processes to synchronize the client access points with regard to the transaction that was performed with regard to the voicemail mailbox of the particular voicemail system, where each of the client access points contains a same view of the voicemail mailbox as a result of the synchronization processes.

22 Claims, 9 Drawing Sheets

SYNCHRONIZING VOICEMAIL AMONG MULTIPLE CLIENT ACCESS POINTS

BACKGROUND INFORMATION

Voicemail systems have been around since the 1970's and are commonplace today. It is common for business users, residential users, and mobile users to have access to voicemail systems. Voicemail systems store and permit access to voicemail and facsimile messages. Voicemail systems may also transcribe the audio of the voicemail into text.

Visual voicemail is a technique of adding a visual aspect to voicemail. Visual voicemail permits users to access voicemail systems and manipulate the messages stored on the voicemail systems over the Internet.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

An implementation, described herein, may synchronize actions taken on voicemail messages, stored on multiple voicemail systems, among a group of client application servers and access points. For example, assume that a user has multiple client access points, each of which can access voicemail from one or more different voicemail systems. Whenever an action is performed with regard to one of these voicemail systems (e.g., a new voicemail (or a new facsimile, video, or text message) is received, a voicemail is deleted, a voicemail is saved, a voicemail is retrieved, a personal identification number (PIN) is changed, a mailbox setting is changed, etc.), each of the client access points can be notified of the action. The client access points may, thus, be kept synchronized as to the state of the voicemail systems.

Figure 1:
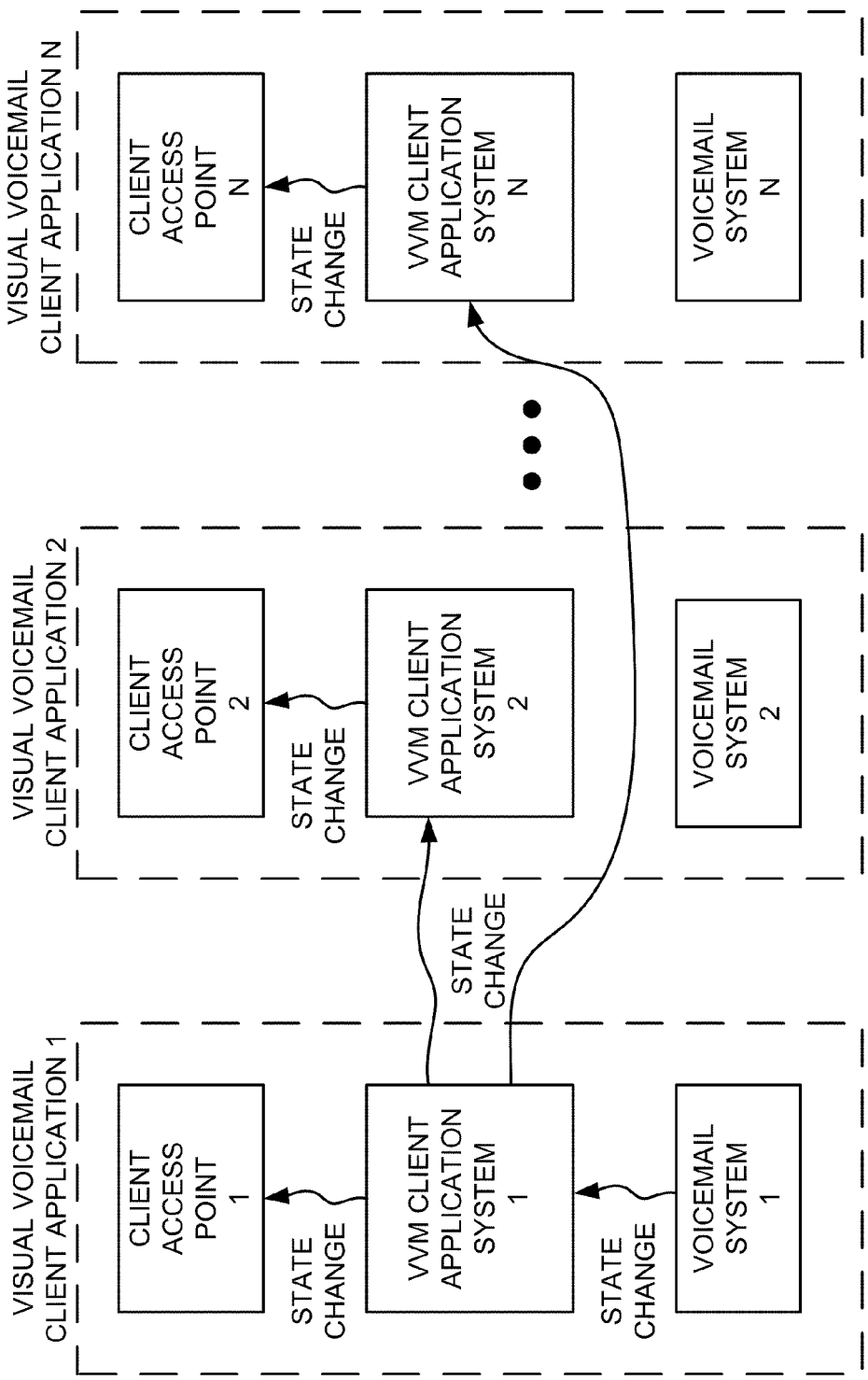
FIG. 1 is a diagram of an overview of an implementation described herein.

FIG. 1 is a diagram of an overview of an implementation described herein. A user may have multiple telephone numbers, such as a home telephone number, a work telephone number, and a mobile telephone number. Each telephone number may have a corresponding voicemail mailbox in a particular voicemail system. The user may use client access points to access voicemail in these voicemail mailboxes. A particular client access point may be associated with a single one of the user's telephone numbers or multiple ones of the user's telephone numbers. In other words, the particular client access point may be used to access voicemail in one or multiple voicemail systems.

As shown in FIG. 1, assume that a user has N client access points associated with N different visual voicemail client applications (where N>1). While FIG. 1 shows the same number of client access points and voicemail systems, this may not be the case in practice. As described briefly above, each client access point may be used to access multiple, different voicemail systems.

Assume, with regard to FIG. 1, that a transaction has occurred with regard to a voicemail mailbox, associated with the user, in voicemail system 1, which results in a state change for the voicemail mailbox. The transaction may take different forms. For example, the transaction may correspond to a new voicemail being stored in the voicemail mailbox, an existing voicemail being deleted from the voicemail mailbox, an existing voicemail being saved in the voicemail mailbox, an existing voicemail being accessed by the user, a personal identification number (or another type of user profile information) being changed, or another type of transaction.

Voicemail system 1 may send information regarding the state change to visual voicemail (VVM) client application system 1. VVM client application system 1 may notify client access point 1 of the state change. VVM client application system 1 may also notify VVM client application systems 2 through N of the state change. VVM client application systems 2 through N may notify client access points 2 through N, respectively, of the state change to the voicemail mailbox in voicemail system 1. Similar operations may be performed when there are state changes with regard to voicemail mailboxes, associated with the user, on voicemail systems 2 through N (not shown in FIG. 1). As a result, client access points 1 through N may be synchronized as to the state of the voicemail mailboxes on voicemail systems 1 through N.

Figure 2:
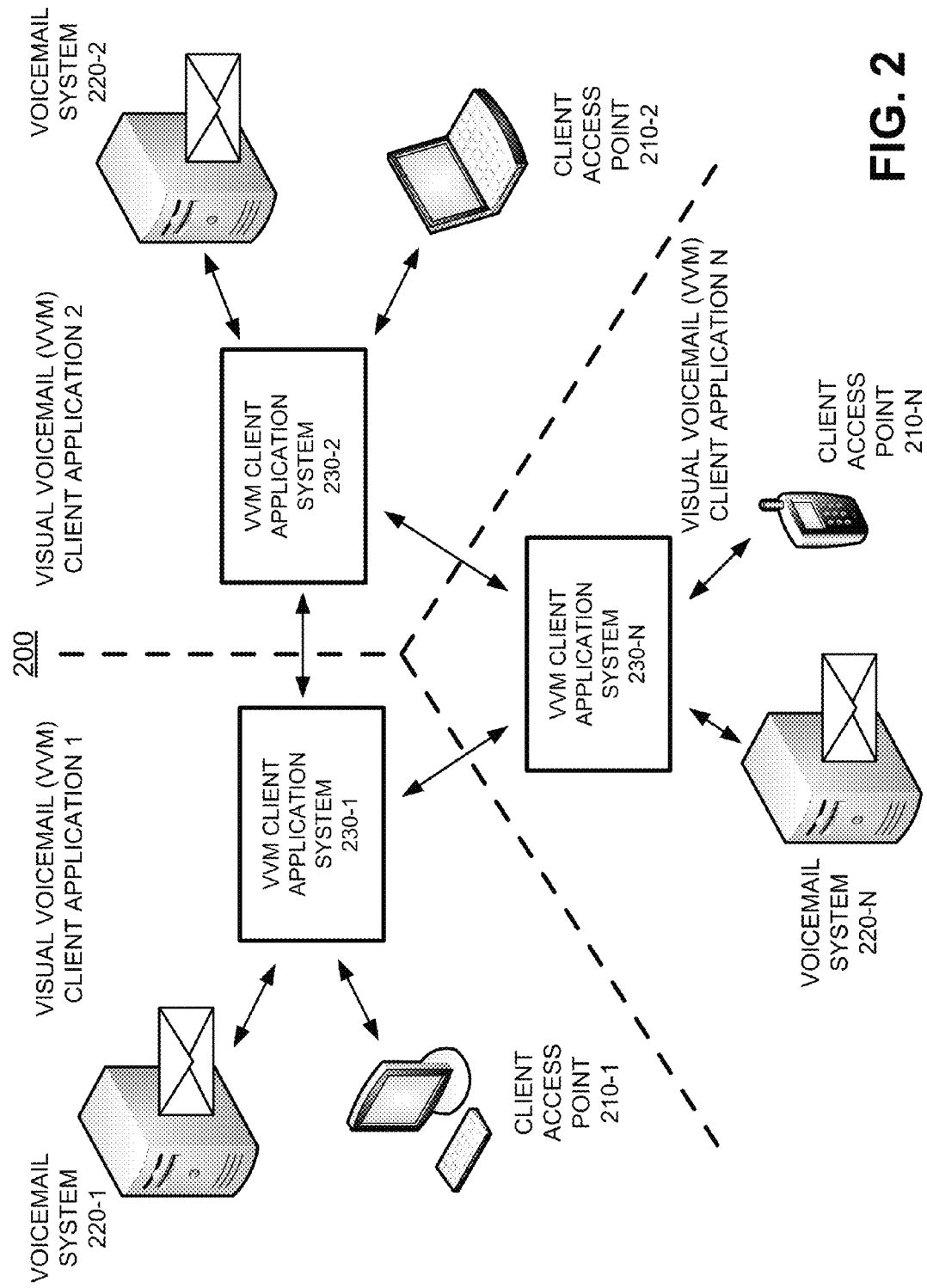
FIG. 2 is a block diagram of an exemplary environment in which systems and/or methods described herein may be implemented.

FIG. 2 is a block diagram of an exemplary environment 200 in which systems and/or methods described herein may be implemented. As shown in FIG. 2, environment 200 may include client access points 210-1, 210-2, . . . , 210-N (referred to generally as "client access points 210," and individually as "client access point 210"), voicemail systems 220-1, 220-2, . . . , 220-N (referred to generally as "voicemail systems 220," and individually as "voicemail systems 220"), and visual voicemail (VVM) client application systems 230-1, 230-2, . . . , 230-N (referred to generally as "VVM client application systems 230," and individually as "VVM client application system 230") (again, where N>1). The connections, shown in FIG. 2, may include wired and/or wireless connections.

As shown in FIG. 2, client access point 210-1, voicemail system 220-1, and VVM client application system 230-1 may correspond to VVM client application 1; client access point 210-2, voicemail system 220-2, and VVM client application system 230-2 may correspond to VVM client application 2; and client access point 210-N, voicemail system 220-N, and VVM client application system 230-N may correspond to VVM client application N. While each VVM client application 1 through N is shown as including a single client access point 210, a single voicemail system 220, and a single VVM client application system 230, in practice, a VVM client application may include additional client access points 210, voicemail systems 220, and/or VVM client application systems 230. Also, one or more of the components of environment 200 may perform one or more functions described as being performed by another one or more of the components of environment 200. Further, although multiple separate VVM client application systems 230 are shown in FIG. 2, in another implementation, a single VVM client application system 230 may be implemented that performs the functions collectively implemented by VVM client application systems 230-1 through 230-N.

Client access point 210 may include any computation or communication device, such as a communication device that is capable of interacting with components of a VVM client application; a client application, running on a computation or communication device, that is capable of interacting with components of a VVM client application; or a web portal, running on a computation or communication device, that is capable of interacting with components of a VVM client application, through a network, such as the Internet. For example, in one implementation, client access point 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a set-top box (STB), a television, a personal gaming system, or another type of computation or communication device. A single computation or communication device may include multiple client access points 210. In one exemplary implementation, client access point 210 may permit a user to view, listen to, and/or manage voicemail. Alternatively, or additionally, client access point 210 may permit a user to manage user profile information associated with a voicemail mailbox on a voicemail system 220.

Voicemail system 220 may include one or more components, such as one or more servers, database servers, communication servers, and/or network devices in one or more geographic locations. The components, of voicemail system 220, may store, manage, and/or process voicemail (or other types of messages (e.g., facsimile, video, and/or text messages) and/or store, manage, and/or process information associated with a voicemail mailbox. Voicemail system 220 may provide voicemail mailboxes for various telephone user types (e.g., home, work, and/or mobile), and may provide a service-wide directory for voicemail mailbox location lookup. The service-wide directory may include telephone numbers, locations of voicemail mailboxes, and/or other information associated with home, work, and/or mobile telephone user types. Voicemail system 220 may include different interfaces for storing, managing, and/or processing voicemail and/or information associated with a voicemail mailbox. One of these interfaces may be referred to as a "telephony interface" via which users may access voicemail system 220 using a telephony network, such as the Public Switched Telephone Network (PSTN) or a voice over Internet protocol (VoIP) network. Another one of these interfaces may be referred to as a "network interface" via which users may access voicemail system 220 using a data network, such as the Internet.

Figure 3:
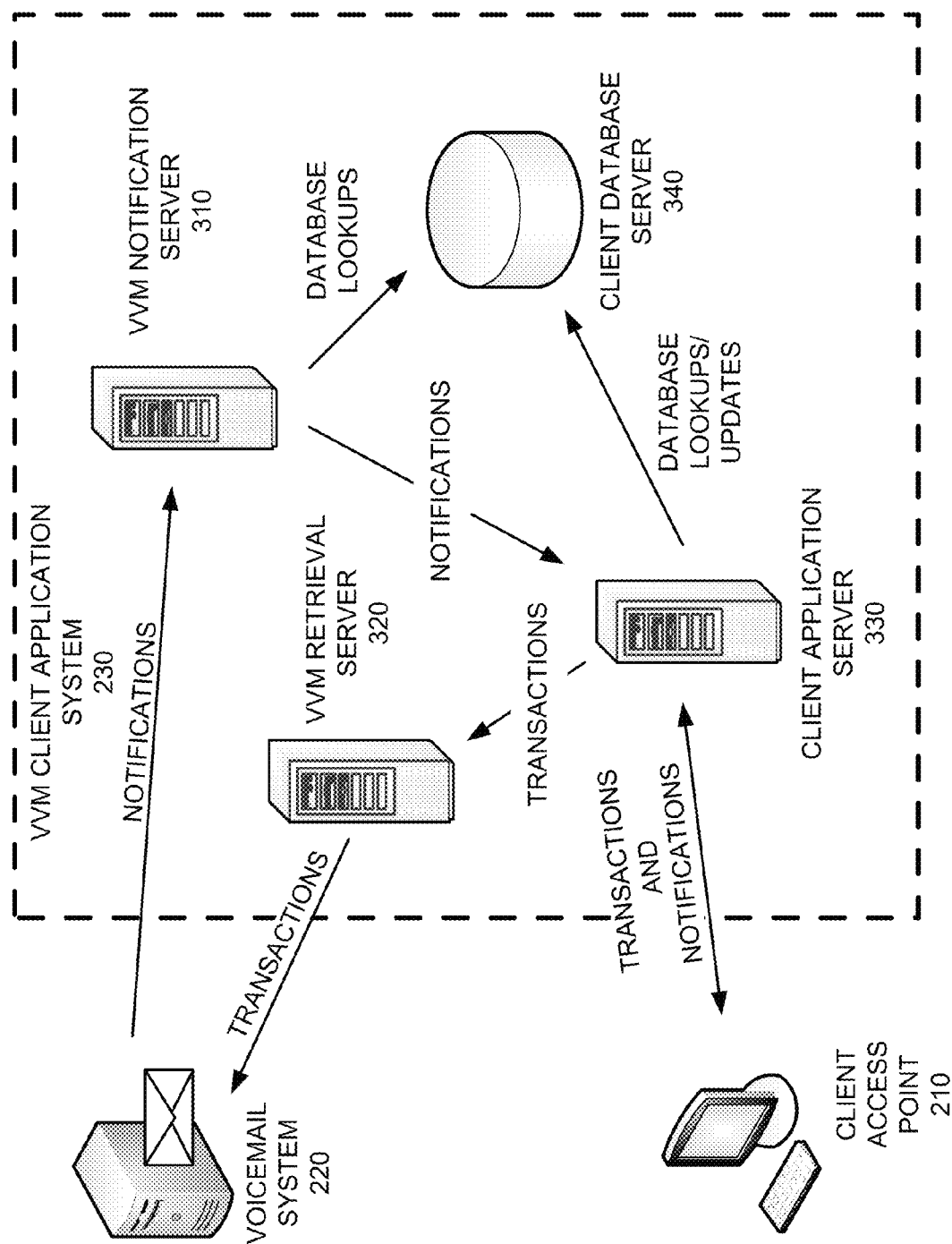
FIG. 3 is a diagram of exemplary components of a visual voicemail (VVM) client application system of FIG. 2.

VVM client application system 230 may include a server, or a collection of servers, that provides visual voicemail services and synchronizes client access points 210 with respect to operations on voicemail systems 220. FIG. 3 is a diagram of exemplary components of VVM client application system 230. As shown in FIG. 3, VVM client application system 230 may include a VVM notification server 310 (hereinafter referred to as "notification server 310"), a VVM retrieval server 320 (hereinafter referred to as "retrieval server 320"), a client application server 330 (hereinafter referred to as "application server 330"), and a client database server 340 (hereinafter referred to as "database server 340"). While FIG. 3 shows that VVM client application system 230 includes a single notification server 310, retrieval server 320, application server 330, and database server 340, in another implementation, VVM client application system 230 may include fewer, additional, different, or differently arranged servers. For example, notification server 310, retrieval server 320, application server 330, and/or database server 340 may be implemented as a single server. Alternatively, any one of notification server 310, retrieval server 320, application server 330, and/or database server 340 may be implemented as multiple, possibly distributed, servers. Further, a function described as being performed by one of the servers, of VVM client application system 230, may be performed by another one of the servers of VVM client application system 230.

Notification server 310 may include a server that receives notifications from voicemail system 220, provides notifications, and/or performs database lookups. For example, notification server 310 may receive a notification from voicemail system 220, and perform a database server 340 lookup with regard to one or more VVM client applications. For any VVM client application that is to be informed regarding the notification (e.g., determined via the database lookups), notification server 310 may provide a notification to application server 330 associated with that/those VVM client application (s).

Retrieval server 320 may include a server that receives transactions from application server 330, of one or more VVM client applications, and/or sends transactions to voicemail system 220. For example, retrieval server 320 may receive a transaction, such as an instruction to delete a voicemail, retrieve a voicemail, save a voicemail, change a PIN, change a mailbox setting, etc., and cause the transaction to be performed on voicemail system 220.

Application server 330 may include a server that receives notifications from notification server 310, performs database server 340 lookups and/or updates, receives transactions from client access point 210, provides notifications to client access point 210, and/or provides transactions to retrieval server 320 of one or more VVM client applications. For example, application server 330 may receive a transaction from client access point 210 and send the transaction to retrieval server 320. Alternatively, or additionally, application server 330 may receive a notification from notification server 310, send the notification to client access point 210, and/or update database server 340 regarding the notification.

Database server 340 may include a server that stores information associated with users of client access points 210. In one implementation, database server 340 may store the information in a database. The term "database," as used herein, is intended to refer to any arrangement of data in one or more memory devices, such as a table, a linked list, or some other arrangement of data. In one implementation, database server 340 may be provisioned to store identifiers associated with client access points 210 (e.g., telephone numbers associated with client access points 210). For example, if the user has three client access points 210 with three different telephone numbers (123-456-7890, 123-789-0123, and 123-890-1234) and all three client access points 210 are to be synchronized, then database server 340 may store all three of the telephone numbers. Database server 340 may also store voicemail information, such as voicemail headers, voicemail lists, and/or voicemail content (e.g., audio, text transcript, etc.), associated with voicemail stored on one or more voicemail systems 220. Database servers 340, of different VVM client applications 230, may store the same or different information for a particular user. For example, one of the user's client access points 210 being synchronized, but not another one of the user's client access points 210.

Figure 4:
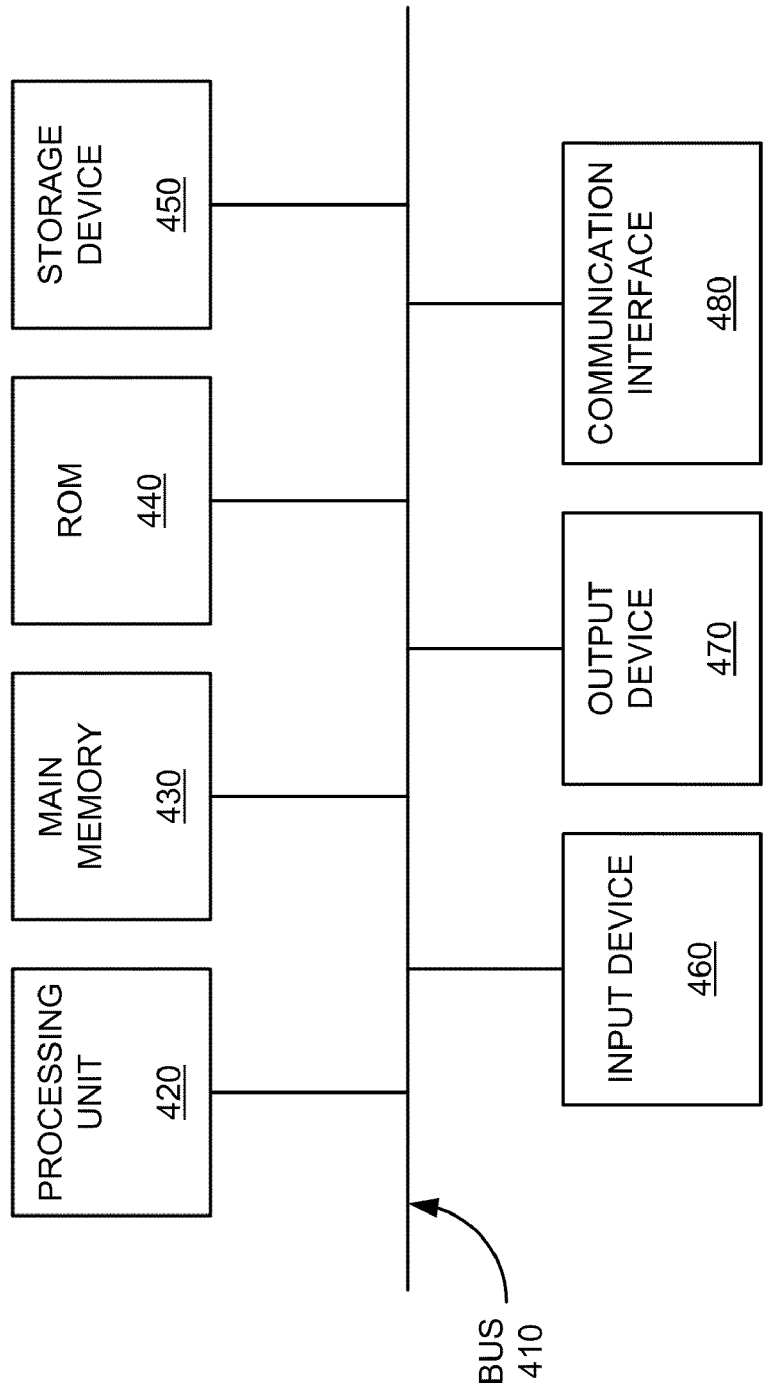
FIG. 4 is a diagram of exemplary components of a computing device that may correspond to one or more of the components of FIG. 2 and/or FIG. 3.

FIG. 4 is a diagram of exemplary components of a computing device 400 that may correspond to one or more of the components shown in FIG. 2 and/or FIG. 3. As illustrated, computing device 400 may include a bus 410, a processing unit 420, a main memory 430, a read-only memory (ROM) 440, a storage device 450, an input device 460, an output device 470, and/or a communication interface 480. Bus 410 may include a path that permits communication among the components of computing device 400.

Processing unit 420 may include a processor, a microprocessor, an application-specific integrated circuit (ASIC), a field programmable gate array (FPGA), or another type of processing unit that may interpret and execute instructions. Main memory 430 may include a random access memory (RAM) or another type of dynamic storage device that may store information and instructions for execution by processing unit 420. ROM 440 may include a ROM device or another type of static storage device that may store static information and/or instructions for use by processing unit 420. Storage device 450 may include a magnetic and/or optical recording medium and its corresponding drive, or a type of flash memory.

Input device 460 may include a mechanism that permits an operator to input information into computing device 400, such as a keyboard, a keypad, a mouse, a pen, a button, a voice recognition and/or biometric mechanism, a touch screen, etc. Output device 470 may include a mechanism that outputs information to the operator, including a display, a speaker, a light emitting diode (LED), etc. Communication interface 480 may include any transceiver-like mechanism that enables computing device 400 to communicate with other computing devices and/or systems. For example, communication interface 480 may include an Ethernet interface, an optical interface, a wireless interface, or the like.

As described herein, computing device 400 may perform certain operations in response to processing unit 420 executing software instructions contained in a computer-readable medium, such as main memory 430. A computer-readable medium may be defined as a physical or logical memory device. A logical memory device may include space within a single physical memory device or spread across multiple physical memory devices. The software instructions may be read into main memory 430 from another computer-readable medium, such as storage device 450, or from another computing device via communication interface 480. The software instructions contained in main memory 430 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows exemplary components of computing device 400, in another implementation, computing device 400 may contain fewer, additional, different, or differently arranged components than depicted in FIG. 4. In still other implementations, one or more components of computing device 400 may perform one or more tasks described as being performed by one or more other components of computing device 400.

Figure 5:
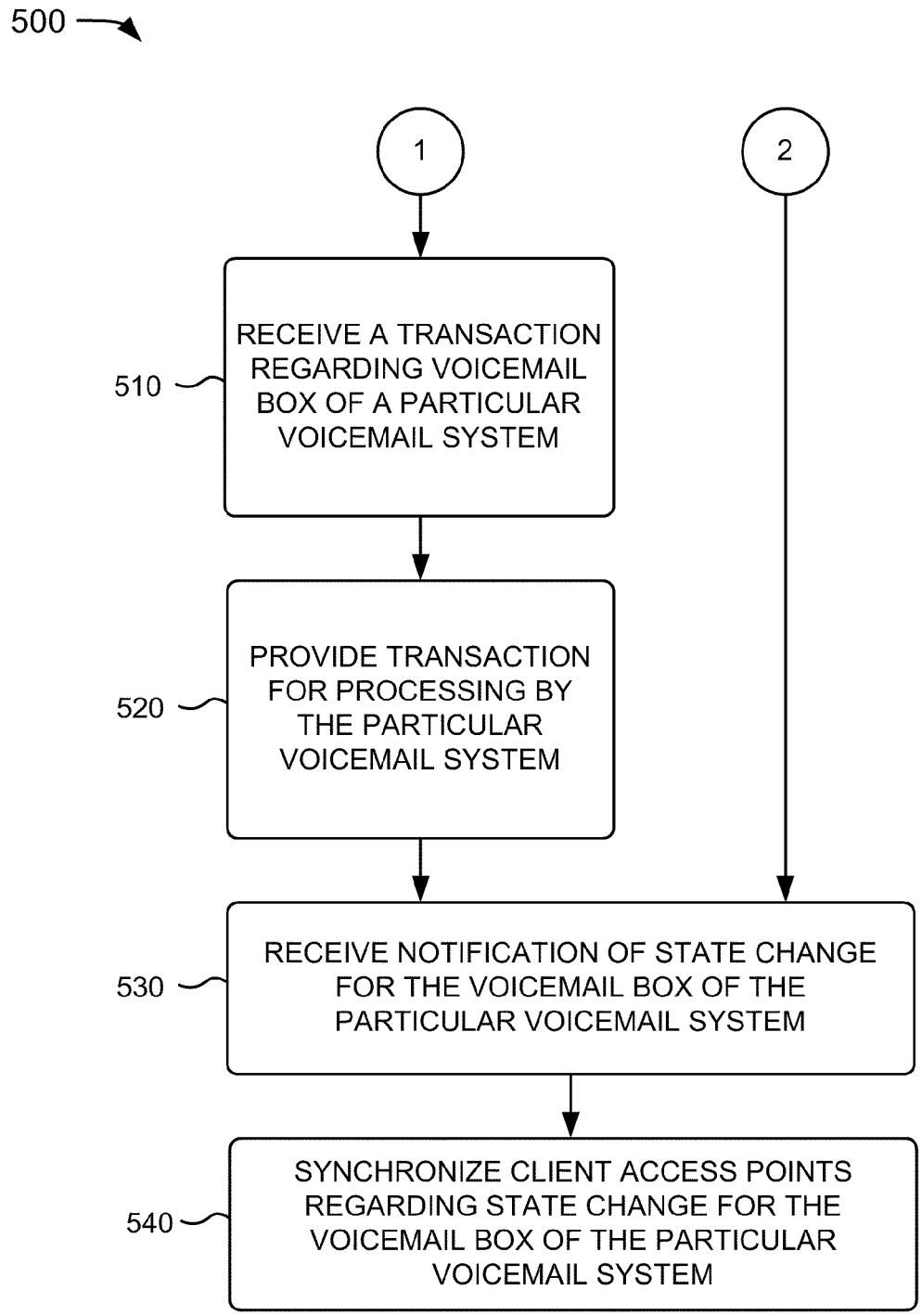
FIG. 5 is a flowchart of an exemplary process for synchronizing a state change among client access points.

FIG. 5 is a flowchart of an exemplary process 500 for synchronizing a state change among client access points 210. Process 500 may be performed by one or more servers of one or more VVM client applications 230. In another implementation, process 500 may be performed by one or more servers separate from or in conjunction with one or more servers of VVM client application(s) 230, such as one or more servers of voicemail system 220. Process 500 will be described with reference to environment 200 in which a user has N client access points associated with N VVM client applications.

Process 500, of FIG. 5, illustrates two different use cases— shown as (1) and (2). Use case (1) corresponds to a situation where a user causes a transaction to be performed on a voicemail mailbox of a voicemail system 220 via the network interface of that voicemail system 220. For example, the user may use a client access point 210 to initiate the transaction. Use case (2) corresponds to a situation where a user causes a transaction to be performed on a voicemail mailbox of a voicemail system 20 via the telephony interface of that voicemail system 220. For example, the user may use a communication device (other than a client access point 210) to initiate the transaction.

With regard to use case (1), process 500 may include receiving a transaction regarding a voicemail mailbox of a particular voicemail system 220 (block 510). For example, assume that the user, via one of the user's client access points 210 (e.g., client access point 210-2), has performed a transaction on a voicemail (e.g., accessed the voicemail, saved the voicemail, deleted the voicemail, etc.) stored in the user's voicemail mailbox of a particular voicemail system (e.g., voicemail system 220-2), or performed a transaction associated with the voicemail mailbox (e.g., changed the user's PIN or some other information associated with the user, or changed a mailbox setting). In this case, client access point 210-2 may send information regarding the transaction to application server 330 of VVM client application system 230-2.

The transaction may be provided for processing by the particular voicemail system 220, which results in a state change for the voicemail mailbox of the particular voicemail system 220 (block 520). For example, application server 330 may send the transaction to retrieval server 320 (of VVM client application system 230-2). Retrieval server 320 may send the transaction to voicemail system 220-2 for processing. The processing of the transaction (e.g., marking the voicemail as not new (already accessed), marking the voicemail as saved, marking the voicemail as deleted, changing the user's PIN, changing a mailbox setting, etc.) by voicemail system 220-2 may result in a state change for the voicemail mailbox.

A notification of the state change, for the voicemail mailbox of the particular voicemail system 220, may be received (block 530). For example, in one implementation, voicemail system 220-2 may generate a simple notification that includes an identifier (e.g., a telephone number) associated with the voicemail mailbox. In another implementation, voicemail system 220-2 may generate a more detailed notification that includes information in addition to the identifier (e.g., telephone number) associated with the voicemail mailbox, such as information regarding what transaction was performed (e.g., what the transaction was (e.g., a new voicemail (or a new facsimile, video, or text message), a save transaction, a delete transaction, an access transaction, a PIN change, or a mailbox setting change)), information regarding what voicemail the transaction was performed on (if applicable), and/or other information that may be useful in synchronizing client access points 210 (e.g., a timestamp associated with the transaction, caller identification (caller ID) information (if the transaction involved a new voicemail), etc.). Voicemail system 220-2 may send the notification to notification server 310 (of VVM client application system 230-2).

Client access points 210 may be synchronized regarding the state change for the voicemail mailbox of the particular voicemail system 220 (block 540). For example, notification server 310 may query database servers 340 of one or more of the VVM client applications to determine whether these VVM client applications are to be notified of transactions associated with the particular telephone number.

Each of database servers 340 may determine whether database server 340 stores the particular telephone number and, when a database server 340 stores the particular telephone number, database server 340 may respond to notification server 310 that the corresponding VVM client application is to be notified of transactions associated with the particular telephone number. For a VVM client application that is to be notified of transactions associated with the particular telephone number, notification server 310 may send information associated with the transaction to application server 330 associated with that VVM client application. Application server 330 may, in turn, notify client access point 210, associated with the VVM client application, of the transaction so as to synchronize that client access point 210 with the state change for the voicemail mailbox of voicemail system 220-2.

The process for synchronizing client access points 210 may differ depending on the type of notification generated by voicemail system 220-2. For example, if voicemail system 220-2 generates the simple notification, then application server 330 may need to prefetch information from voicemail system 220-2 to determine what happened to the voicemail mailbox associated with the notification. In one implementation, the prefetched information may include information regarding the transaction that lead to the state change in the voicemail mailbox and/or information regarding one or more, or all, of the voicemail stored in the voicemail mailbox (e.g., headers of the voicemail messages, a list of the voicemail stored in the voicemail mailbox, and/or the content of the voicemail). If voicemail system 220-2 generates the more detailed notification, then application servers 330 may synchronize client access points 210 without the need to prefetch the information. In this case, application servers 330 would already have (from the notification) the information needed to synchronize client access points 210.

With regard to use case (2), assume that a user performs a transaction regarding a voicemail mailbox of a particular voicemail system 220 (e.g., voicemail system 220-2) using a communication device other than client access point 210. For example, the user may utilize a telephony network to perform a transaction regarding the voicemail mailbox. In one implementation, the transaction, which may be performed by any user, may involve storing a new voicemail. In another implementation, the transaction, which may be performed by the user (i.e., owner of client access points 210), may involve deleting a voicemail, saving a voicemail, accessing a voicemail, changing the user's PIN or some other information associated with the user, changing a mailbox setting, etc. In this case, the user may interact directly with voicemail system 220-2 to perform the transaction.

Voicemail system 220-2 may process the transaction. The processing of the transaction (e.g., storing the voicemail, marking the voicemail as not new (already accessed), marking the voicemail as saved, marking the voicemail as deleted, changing the user's PIN, changing a mailbox setting, etc.) by voicemail system 220-2 may result in a state change for the voicemail mailbox.

A notification of the state change, for the voicemail mailbox of the particular voicemail system 220, may be received (block 530). For example, in one implementation, voicemail system 220-2 may generate a simple notification or a more detailed notification, as described above. Voicemail system 220-2 may send the notification to notification server 310 (of VVM client application system 230-2).

Client access points 210 may be synchronized regarding the state change for the voicemail mailbox of the particular voicemail system 220 (block 540). For example, notification server 310 may query database servers 340 of one or more of the VVM client applications to determine whether these VVM client applications are to be notified of transactions associated with the particular telephone number.

Each of database servers 340 may determine whether database server 340 is provisioned to store information for the particular telephone number and, when a database server 340 is provisioned to store information for the particular telephone number, database server 340 may respond to notification server 310 that the corresponding VVM client application is to be notified of transactions associated with the particular telephone number. For a VVM client application that is to be notified of transactions associated with the particular telephone number, notification server 310 may send information associated with the transaction to application server 330 associated with that VVM client application. Application server 330 may, in turn, notify client access point 210, associated with the VVM client application, of the transaction so as to synchronize that client access point 210 with the state change for the voicemail mailbox of voicemail system 220-2.

As explained above, the process for synchronizing client access points 210 may differ depending on the type of notification generated by voicemail system 220-2. For example, if voicemail system 220-2 generates the simple notification, then application server 330 may need to prefetch information from voicemail system 220-2 to determine what happened to the voicemail mailbox associated with the notification, as described above. If voicemail system 220-2 generates the more detailed notification, then application servers 330 may synchronize client access points 210 without the need to prefetch the information. In this case, application servers 330 would already have (from the notification) the information needed to synchronize client access points 210.

FIG. 5 shows a general process for obtaining full synchronization among client access points 210. Exemplary call flows that may be involved, among the components of environment 200, will be described with regard to the call flow diagrams of FIGS. 6A-8.

Figure 6A:
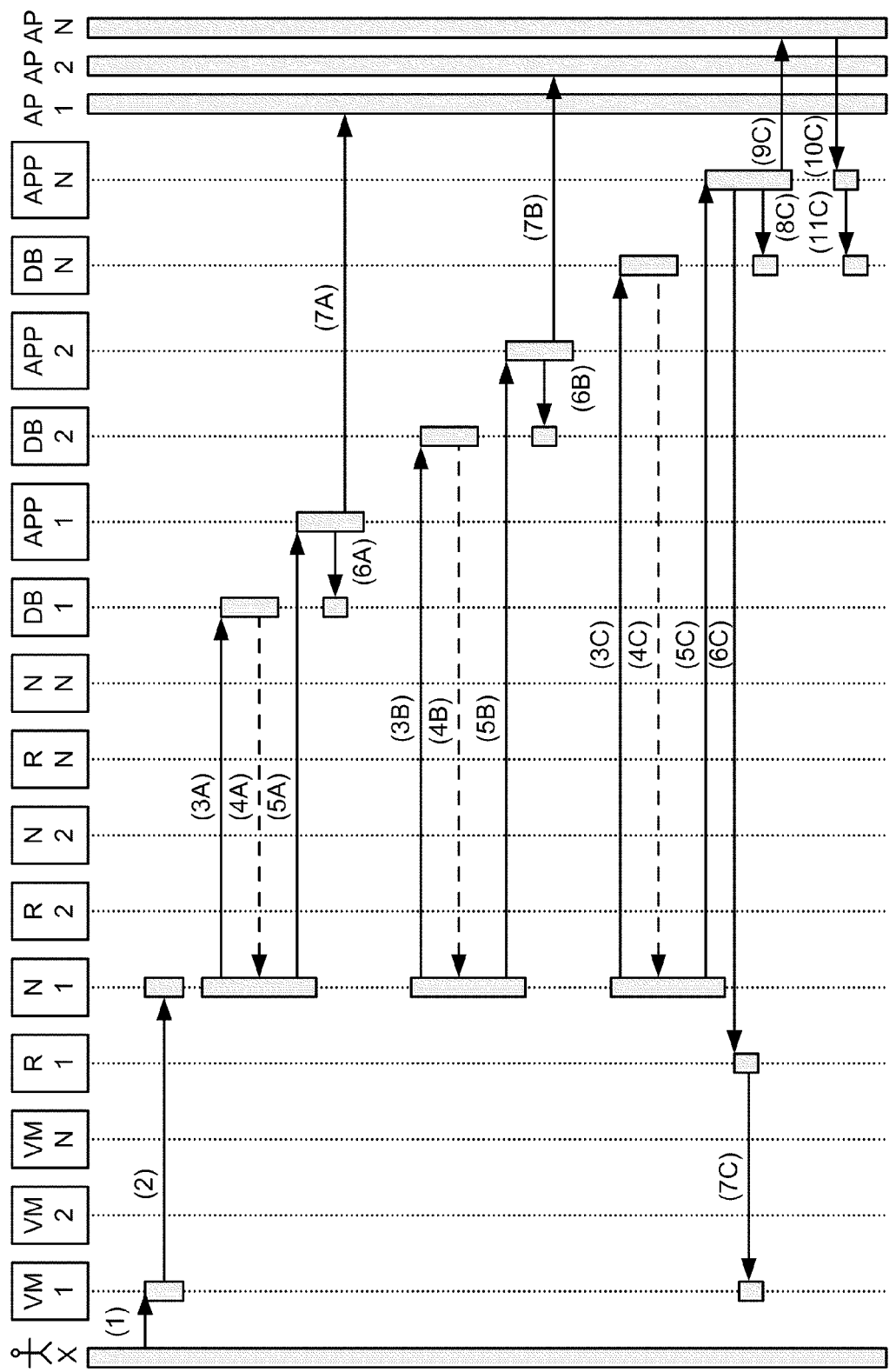
FIG. 6A is a diagram of an exemplary call flow for synchronizing client access points, in one implementation, when a user makes a change to a voicemail mailbox of a particular voicemail system.

FIG. 6A is a diagram of an exemplary call flow for synchronizing client access points 210, in one implementation, when a user makes a change to a voicemail mailbox of a particular voicemail system 220. As shown in FIG. 6A, assume that the exemplary call flow occurs in environment 200 and includes voicemail systems 220: VM_1, VM_2, and VM_N; retrieval servers 320: R_1, R_2, and R_N; notification servers 310: N_1, N_2, and N_N; database servers 340: DB_1, DB_2, DB_N; application servers 330: APP_1, APP_2, and APP_N; and client access points 210: AP_1, AP_2, and AP_N.

A user (labeled as user X) may perform a transaction on a voicemail mailbox of voicemail system VM_1, as shown as (1) in FIG. 6A. For example, user X may leave a new voicemail in the voicemail mailbox associated with client access point AP_1. In this case, user X may call the telephone number associated with (e.g., displayed on) client access point AP_1 and upon receiving no answer, user X may be directed to voicemail system VM_1 and prompted to leave a voicemail message. Alternatively, user X may correspond to the user who owns client access points AP_1, AP_2, and AP_N. In this case, the user may access voicemail system VM_1, via a telephony network, to perform a transaction, such as to listen to a voicemail, to save a voicemail, to delete a voicemail, to change a PIN, to change a voicemail setting, etc. The transaction may result in a state change with regard to the voicemail mailbox of voicemail system VM_1.

Voicemail system VM_1 may generate a notification regarding the state change and send the notification to notification server N_1, as shown as (2) in FIG. 6A. The notification may take different forms, as described above. For example, a simple notification may include information identifying the telephone number associated with the voicemail mailbox (e.g., in this case, the telephone number associated with client access point AP_1). A more detailed notification may include, in addition to the telephone number associated with the voicemail mailbox, information regarding what transaction was performed (e.g., what the transaction was (e.g., a new voicemail (or a new facsimile, video, or text message), a save transaction, a delete transaction, an access transaction, a PIN change, or a change to a mailbox setting)), information regarding what voicemail the transaction was performed on (if applicable), and/or other information that may be useful in synchronizing client access points 210 (e.g., a timestamp associated with the transaction, caller identification (caller ID) information (if the transaction involved a new voicemail), etc.). The process of FIG. 6A illustrates the situation where voicemail system VM_1 generates the more detailed notification.

In one implementation, voicemail system VM_1 may transmit the notification as an Extensible Markup Language (XML) message to notification server N_1. In another implementation, the notification may be transmitted using a different format.

Notification server N_1 may process the notification and determine that the notification may need to be provided to one or more VVM client applications. In parallel, notification server N_1 may initiate synchronization processes for synchronizing client access points AP_1, AP_2, and AP_N so that client access points AP_1, AP_2, and AP_N have a same view of the state of the voicemail mailbox in voicemail system VM_1. In one implementation, the synchronization processes may be the same for client access points AP_1, AP_2, and AP_N. In another implementation, one or more of the synchronization processes may differ. FIG. 6A illustrates this other implementation.

With regard to one of the synchronization processes, notification server N_1 may perform a database lookup on database server DB_1, as shown as (3A) in FIG. 6A. For example, notification server N_1 may send a request, to database server DB_1, regarding whether database server DB_1 includes the telephone number associated with client access point AP_1. As described above, database server DB_1 may store the telephone number of a client access point 210 to indicate that the corresponding VVM client application is to be synchronized regarding state changes for a voicemail mailbox associated with that client access point 210. Since database server DB_1 is associated with the same VVM client application as client access point AP_1, database server DB_1 may include the telephone number associated with client access point AP_1.

Database server DB_1 may generate a response to the request, from notification server N_1, that indicates that database server DB_1 either stores the telephone number (e.g., YES) or does not store the telephone number (e.g., NO). Database server DB_1 may send the response to notification server N_1, as shown as (4A) in FIG. 6A.

If notification server N_1 receives a response, from database server DB_1, that indicates that database server DB_1 does not store the telephone number, then notification server N_1 may terminate the synchronization process with regard to client access point AP_1.

If, on the other hand, notification server N_1 receives a response, from database server DB_1, that indicates that database server DB_1 stores the telephone number, then notification server N_1 may send a notification regarding the state change to application server APP_1, as shown as (5A) in FIG. 6A. In one implementation, the notification, from notification server N_1, may include information associated with the notification generated by voicemail system VM_1. In one implementation, notification server N_1 may transmit the notification as an XML message to application server APP_1. In another implementation, the notification may be transmitted using a different format.

Application server APP_1 may process the notification and perform an update on database server DB_1, as shown as (6A) in FIG. 6A. For example, application server APP_1 may store information regarding the state change in database server DB_1. Application server APP_1 may also send a notification to client access point AP_1, as shown as (7A) in FIG. 6A. In one implementation, the notification, from application server APP_1, may include information associated with the notification generated by voicemail system VM_1. Client access point AP_1 may then update its voicemail information based on the information received from application server APP_1.

With regard to another one of the synchronization processes, notification server N_1 may perform a database lookup on database server DB_2, as shown as (3B) in FIG. 6A. For example, notification server N_1 may send a request, to database server DB_2, regarding whether database server DB_2 includes the telephone number associated with client access point AP_1. As described above, database server DB_2 may store the telephone number of a client access point 210 to indicate that the corresponding VVM client application is to be synchronized regarding state changes for a voicemail mailbox associated with that client access point 210.

Database server DB_2 may generate a response to the request, from notification server N_1, that indicates that database server DB_2 either stores the telephone number (e.g., YES) or does not store the telephone number (e.g., NO). Database server DB_2 may send the response to notification server N_1, as shown as (4B) in FIG. 6A.

If notification server N_1 receives a response, from database server DB_2, that indicates that database server DB_2 does not store the telephone number, then notification server N_1 may terminate the synchronization process with regard to client access point AP_2.

If, on the other hand, notification server N_1 receives a response, from database server DB_2, that indicates that database server DB_2 stores the telephone number, then notification server N_1 may send a notification regarding the state change to application server APP_2, as shown as (5B) in FIG. 6A. In one implementation, the notification, from notification server N_1, may include information associated with the notification generated by voicemail system VM_1. In one implementation, notification server N_1 may transmit the notification as an XML message to application server APP_2. In another implementation, the notification may be transmitted using a different format.

Application server APP_2 may process the notification and perform an update on database server DB_2, as shown as (6B) in FIG. 6A. For example, application server APP_2 may store information regarding the state change in database server DB_2. Application server APP_2 may also send a notification to client access point AP_2, as shown as (7B) in FIG. 6A. In one implementation, the notification, from application server APP_2, may include information associated with the notification generated by voicemail system VM_1. Client access point AP_2 may then update its voicemail information based on the information received from application server APP_2.

With regard to a further one of the synchronization processes, notification server N_1 may perform a database lookup on database server DB_N, as shown as (3C) in FIG. 6A. For example, notification server N_1 may send a request, to database server DB_N, regarding whether database server DB_N includes the telephone number associated with client access point AP_1. As described above, database server DB_N may store the telephone number of a client access point 210 to indicate that the corresponding VVM client application is to be synchronized regarding state changes for a voicemail mailbox associated with that client access point 210.

Database server DB_N may generate a response to the request, from notification server N_1, that indicates that database server DB_N either stores the telephone number (e.g., YES) or does not store the telephone number (e.g., NO). Database server DB_N may send the response to notification server N_1, as shown as (4C) in FIG. 6A.

If notification server N_1 receives a response, from database server DB_N, that indicates that database server DB_N does not store the telephone number, then notification server N_1 may terminate the synchronization process with regard to client access point AP_N.

If, on the other hand, notification server N_1 receives a response, from database server DB_N, that indicates that database server DB_N stores the telephone number, then notification server N_1 may send a notification regarding the state change to application server APP_N, as shown as (5C) in FIG. 6A. In one implementation, the notification, from notification server N_1, may include information associated with the notification generated by voicemail system VM_1. In one implementation, notification server N_1 may transmit the notification as an XML message to application server APP_N. In another implementation, the notification may be transmitted using a different format.

Application server APP_N may process the notification and may prefetch information from voicemail server VM_1. For example, application server APP_N may send a prefetch request to retrieval server R_1, as shown as (6C) in FIG. 6A. In one implementation, the prefetch request may include information regarding a particular voicemail and/or voicemail mailbox (e.g., a voicemail identifier and/or a voicemail mailbox identifier) and/or the telephone number associated with client access point AP_1.

Retrieval server R_1 may obtain the prefetch request, from application server APP_N, and issue the prefetch request to voicemail system VM_1, as shown as (7C) in FIG. 6A. Voicemail system VM_1 may provide the prefetched information to retrieval server R_1, which may return the prefetched information to application server APP_N (not shown in FIG. 6A). In one implementation, the prefetched information may include information regarding one or more, or all, of the voicemail stored in the voicemail mailbox of voicemail system VM_1 (e.g., headers of the voicemail messages, a list of the voicemail stored in the voicemail mailbox, and/or the content of the voicemail).

Application server APP_N may perform an update on database server DB_N, as shown as (8C) in FIG. 6A. For example, application server APP_N may store information regarding the state change and/or the prefetched information in database server DB_N. Application server APP_N may also send a notification to client access point AP_N, as shown as (9C) in FIG. 6A. In one implementation, the notification, from application server APP_N, may include information associated with the notification generated by voicemail system VM_1. Client access point AP_N may then update its voicemail information based on the information received from application server APP_N.

Client access point AP_N may request some or all of the prefetched information. In this case, client access point AP_N may send a request to application server APP_N for the prefetched information, as shown as (10C) in FIG. 6A. In one implementation, the request may include information identifying the telephone number associated with client access point AP_1. Application server APP_N may receive the request and retrieve some or all of the prefetched information from database server DB_N, as shown as (11C) in FIG. 6A. Application server APP_N may provide some or all of the prefetched information to client access point AP_N (not shown in FIG. 6A). Client access point AP_N may then update its voicemail information based on the prefetched information received from application server APP_N.

While FIG. 6A illustrates situations both where information is prefetched (e.g., see (3C)-(11C)) and where information is not prefetched (e.g., see (3A)-(7A) and (3B)-(7B)), in other implementations, information may be prefetched in every situation, some situations, or none of the situations.

Figure 6B:
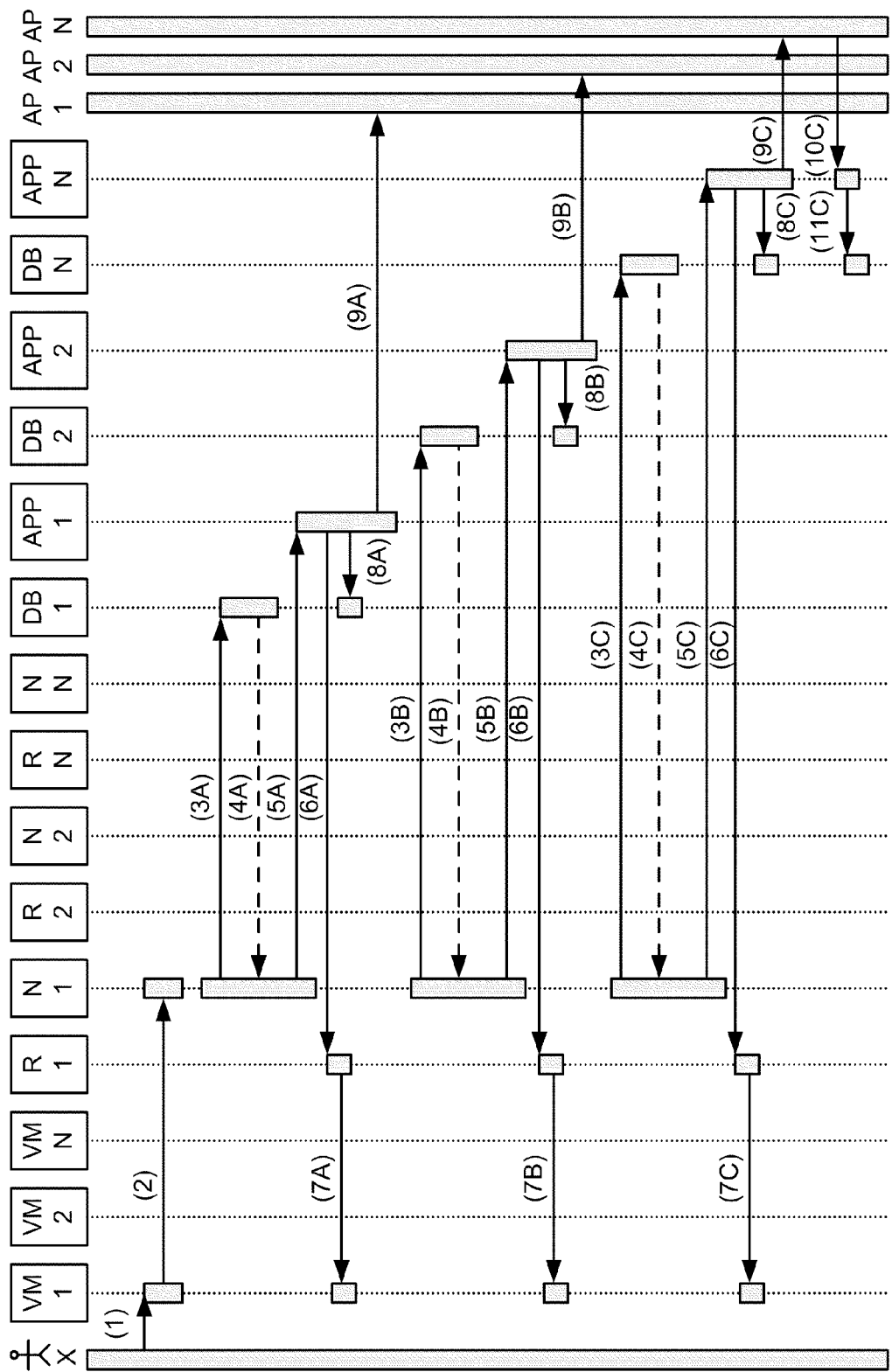
FIG. 6B is a diagram of an exemplary call flow for synchronizing client access points, in another implementation, when a user makes a change to a voicemail mailbox of a particular voicemail system.

FIG. 6B is a diagram of an exemplary call flow for synchronizing client access points 210, in another implementation, when a user makes a change to a voicemail mailbox of a particular voicemail system 220. As shown in FIG. 6B, assume that the exemplary call flow occurs in environment 200 and includes voicemail systems 220: VM_1, VM_2, and VM_N; retrieval servers 320: R_1, R_2, and R_N; notification servers 310: N_1, N_2, and N_N; database servers 340: DB_1, DB_2, DB_N; application servers 330: APP_1, APP_2, and APP_N; and client access points 210: AP_1, AP_2, and AP_N.

A user (labeled as user X) may perform a transaction on a voicemail mailbox of voicemail system VM_1, as shown as (1) in FIG. 6B. For example, user X may leave a new voicemail in the voicemail mailbox associated with client access point AP_1. In this case, user X may call the telephone number associated with client access point AP_1 and upon receiving no answer, user X may be directed to voicemail system VM_1 and prompted to leave a voicemail message. Alternatively, user X may correspond to the user who owns client access points AP_1, AP_2, and AP_N. In this case, the user may access voicemail system VM_1, via a telephony network, to perform a transaction, such as to listen to a voicemail, to save a voicemail, to delete a voicemail, to change a PIN, to change a mailbox setting, etc. The transaction may result in a state change with regard to the voicemail mailbox of voicemail system VM_1.

Voicemail system VM_1 may generate a notification regarding the state change and send the notification to notification server N_1, as shown as (2) in FIG. 6B. The notification may take different forms, as described above. For example, a simple notification may include information identifying the telephone number associated with the voicemail mailbox (e.g., in this case, the telephone number associated with client access point AP_1). A more detailed notification may include, in addition to the telephone number associated with the voicemail mailbox, information regarding what transaction was performed (e.g., what the transaction was (e.g., a new voicemail (or a new facsimile, video, or text message), a save transaction, a delete transaction, an access transaction, a PIN change, or a mailbox setting change)), information regarding what voicemail the transaction was performed on (if applicable), and/or other information that may be useful in synchronizing client access points 210 (e.g., a timestamp associated with the transaction, caller identification (caller ID) information (if the transaction involved a new voicemail), etc.). The process of FIG. 6B illustrates the situation where voicemail system VM_1 generates the simple notification.

In one implementation, voicemail system VM_1 may transmit the notification as an Extensible Markup Language (XML) message to notification server N_1. In another implementation, the notification may be transmitted using a different format.

Notification server N_1 may process the notification and determine that the notification may need to be provided to one or more VVM client applications. In parallel, notification server N_1 may initiate synchronization processes for synchronizing client access points AP_1, AP_2, and AP_N so that client access points AP_1, AP_2, and AP_N have a same view of the state of the voicemail mailbox in voicemail system VM_1. In one implementation, the synchronization processes may be the same for client access points AP_1, AP_2, and AP_N. In another implementation, one or more of the synchronization processes may differ. FIG. 6B illustrates the former implementation.

With regard to one of the synchronization processes, notification server N_1 may perform a database lookup on database server DB_1, as shown as (3A) in FIG. 6B. For example, notification server N_1 may send a request, to database server DB_1, regarding whether database server DB_1 includes the telephone number associated with client access point AP_1. As described above, database server DB_1 may store the telephone number of a client access point 210 to indicate that the corresponding VVM client application is to be synchronized regarding state changes for a voicemail mailbox associated with that client access point 210. Since database server DB_1 is associated with the same VVM client application as client access point AP_1, database server DB_1 may include the telephone number associated with client access point AP_1.

Database server DB_1 may generate a response to the request, from notification server N_1, that indicates that database server DB_1 either stores the telephone number (e.g., YES) or does not store the telephone number (e.g., NO). Database server DB_1 may send the response to notification server N_1, as shown as (4A) in FIG. 6B.

If notification server N_1 receives a response, from database server DB_1, that indicates that database server DB_1 does not store the telephone number, then notification server N_1 may terminate the synchronization process with regard to client access point AP_1.

If, on the other hand, notification server N_1 receives a response, from database server DB_1, that indicates that database server DB_1 stores the telephone number, then notification server N_1 may send a notification regarding the state change to application server APP_1, as shown as (5A) in FIG. 6B. In one implementation, the notification, from notification server N_1, may include information regarding the telephone number associated with client access point AP_1. Notification server N_1 may transmit the notification as an XML message to application server APP_1. Alternatively, the notification may be transmitted using a different format.

Application server APP_1 may process the notification and perform a prefetch of information from voicemail system VM_1. In this case, the prefetched information may include voicemail message headers of the voicemail messages stored in the voicemail mailbox of voicemail system VM_1. In another implementation, the prefetched information may include other information that may be useful to synchronize client access point CD_1.

For example, application server APP_N may send a prefetch request to retrieval server R_1, as shown as (6A) in FIG. 6B. In one implementation, the prefetch request may include information regarding the telephone number associated with client access point AP_1. Retrieval server R_1 may obtain the prefetch request, from application server APP_1, and issue the prefetch request to voicemail system VM_1, as shown as (7A) in FIG. 6B. Voicemail system VM_1 may provide the prefetched information to retrieval server R_1, which may return the prefetched information to application server APP_1 (not shown in FIG. 6B).

Application server APP_1 may perform an update on database server DB_1, as shown as (8A) in FIG. 6B. For example, application server APP_1 may store information regarding the notification and/or some or all of the prefetched information in database server DB_1. Application server APP_1 may also send a notification to client access point AP_1, as shown as (9A) in FIG. 6B. In one implementation, the notification, from application server APP_1, may include information associated with the notification generated by voicemail system VM_1 (e.g., a notification that a new voicemail is stored, a notification that something has happened with regard to the voicemail mailbox of voicemail system VM_1, or some other type of indicator) and/or some or all of the prefetched information. If the notification includes the prefetched information, then client access point AP_1 may update its voicemail information based on the information received from application server APP_1. If the notification does not include the prefetched information, then client access point AP_1 may request the prefetched information from application server APP_1 and then update its voicemail information based on the prefetched information.

The other synchronization processes (illustrated as (3B)-(9B) and (3C)-(11C) may be similar to the synchronization process described above with regard to (3A)-(9A) and with regard to corresponding synchronization processes described above with regard to FIG. 6A.

Figure 7:
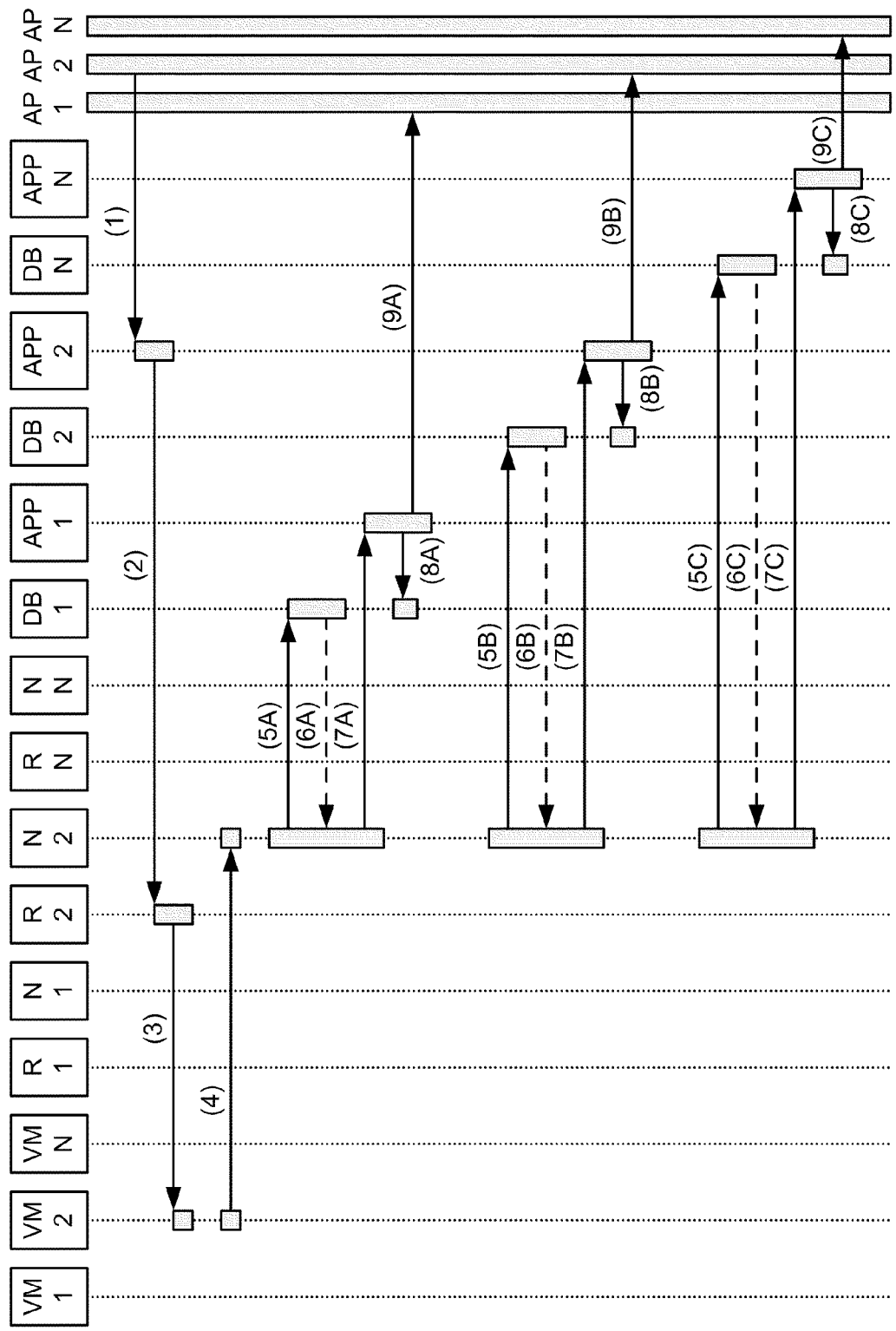
FIG. 7 is a diagram of an exemplary call flow for synchronizing client access points when a client access point performs a change to a voicemail mailbox of a voicemail system associated with the VVM client application system associated with that client access point.

FIG. 7 is a diagram of an exemplary call flow for synchronizing client access points 210 when a client access point 210 performs a change to a voicemail mailbox of a voicemail system 220 associated with the VVM client application system 230 associated with that client access point 210. As shown in FIG. 7, assume that the exemplary call flow occurs in environment 200 and includes voicemail systems 220: VM_1, VM_2, and VM_N; retrieval servers 320: R_1, R_2, and R_N; notification servers 310: N_1, N_2, and N_N; database servers 340: DB_1, DB_2, DB_N; application servers 330: APP_1, APP_2, and APP_N; and client access points 210: AP_1, AP_2, and AP_N.

A user may request, via client access point AP_2, that a transaction be performed on a voicemail stored in a voicemail mailbox of voicemail system VM_2. For example, the user may request access to the voicemail, request that the voicemail be saved, request that the voicemail be deleted, etc. Client access point AP_2 may send the transaction request to application server APP_2, associated with the same VVM client application as client access point AP_2 and voicemail system VM_2, as shown as (1) in FIG. 7. In one implementation, the transaction request may include information regarding what the transaction is and/or information regarding the telephone number associated with the voicemail (e.g., in this case, the telephone number associated with client access point AP_2).

Application server APP_2 may receive the transaction request and identify the transaction as corresponding to voicemail system VM_2. Application server APP_2 may make this determination based, for example, on the telephone number included in the received transaction request. Application server APP_2 may send a transaction request to retrieval server R_2, as shown as (2) in FIG. 7. In one implementation, the transaction request, from application server APP_2, may include information regarding what the transaction is and/or information regarding the telephone number associated with client access point AP_2.

Retrieval server R_2 may receive the transaction request and identify the transaction as corresponding to voicemail system VM_2. Retrieval server R_2 may make this determination based, for example, on the telephone number included in the received transaction request. Retrieval server R_2 may send a transaction request to voicemail system VM_2, as shown as (3) in FIG. 7. In one implementation, the transaction request, from retrieval server R_2, may include information regarding what the transaction is and/or information regarding the telephone number associated with client access point AP_2.

Voicemail system VM_2 may receive the transaction request and identify the appropriate voicemail mailbox based, for example, on the telephone number included in the received transaction request. Voicemail system VM_2 may perform the transaction on the voicemail stored in the identified voicemail mailbox, which may result in a state change with regard to the voicemail mailbox. Voicemail system VM_2 may generate a notification regarding the state change and send the notification to notification server N_2, as shown as (4) in FIG. 7. In one implementation, a simple notification, from voicemail system VM_2, may include information identifying the telephone number associated with the voicemail mailbox (e.g., in this case, the telephone number associated with client access point AP_2). A more detailed notification may include, in addition to the telephone number associated with the voicemail mailbox, information regarding what transaction was performed (e.g., what the transaction was (e.g., a new voicemail (or a new facsimile, video, or text message), a save transaction, a delete transaction, an access transaction, a PIN change, or a mailbox setting change)), information regarding what voicemail the transaction was performed on (if applicable), and/or other information that may be useful in synchronizing client access points 210 (e.g., a timestamp associated with the transaction, etc.). The process of FIG. 7 illustrates the situation where voicemail system VM_2 generates the more detailed notification. Voicemail system VM_2 may transmit the notification as an XML message to notification server N_2. Alternatively, the notification may be transmitted using a different format.

Notification server N_2 may process the notification and determine that the notification may need to be provided to one or more VVM client applications. In parallel, notification server N_2 may initiate synchronization processes for synchronizing client access points AP_1, AP_2, and AP_N so that client access points AP_1, AP_2, and AP_N have a same view of the state of the voicemail mailbox in voicemail system VM_2. In one implementation, the synchronization processes may be the same for client access points AP_1, AP_2, and AP_N. In another implementation, one or more of the synchronization processes may differ. In yet another implementation, one of the synchronization processes may not be performed. For example, notification server N_2 may not need to synchronize client access point AP_2 because client access point AP_2 initiated the transaction and, thus, client access point AP_2 is already synchronized.

With regard to one of the synchronization processes, notification server N_2 may perform a database lookup on database server DB_1, as shown as (5A) in FIG. 7. For example, notification server N_2 may send a request, to database server DB_1, regarding whether database server DB_1 includes the telephone number associated with client access point AP_2. As described above, database server DB_1 may store the telephone number of a client access point 210 to indicate that the corresponding VVM client application is to be synchronized regarding state changes for a voicemail mailbox associated with that client access point 210.

Database server DB_1 may generate a response to the request, from notification server N_2, that indicates that database server DB_1 either stores the telephone number (e.g., YES) or does not store the telephone number (e.g., NO). Database server DB_1 may send the response to notification server N_2, as shown as (6A) in FIG. 7.

If notification server N_2 receives a response, from database server DB_1, that indicates that database server DB_1 does not store the telephone number, then notification server N_2 may terminate the synchronization process with regard to client access point AP_1.

If, on the other hand, notification server N_2 receives a response, from database server DB_1, that indicates that database server DB_1 stores the telephone number, then notification server N_2 may send a notification regarding the state change to application server APP_1, as shown as (7A) in FIG. 7. In one implementation, the notification, from notification server N_2, may include information associated with the notification generated by voicemail system VM_2. In one implementation, notification server N_2 may transmit the notification as an XML message to application server APP_1. In another implementation, the notification may be transmitted using a different format.

Application server APP_1 may process the notification and perform an update on database server DB_1, as shown as (8A) in FIG. 7. For example, application server APP_1 may store information regarding the state change in database server DB_1. Application server APP_1 may also send a notification to client access point AP_1, as shown as (9A) in FIG. 7. In one implementation, the notification, from application server APP_1, may include information associated with the notification generated by voicemail system VM_2. Client access point AP_1 may then update its voicemail information based on the information received from application server APP_1.

With regard to another one of the synchronization processes, notification server N_2 may perform a database lookup on database server DB_2, as shown as (5B) in FIG. 7. For example, notification server N_2 may send a request, to database server DB_2, regarding whether database server DB_2 includes the telephone number associated with client access point AP_2. As described above, database server DB_2 may store the telephone number of a client access point 210 to indicate that the corresponding VVM client application is to be synchronized regarding state changes for a voicemail mailbox associated with that client access point 210. In this case, since database server DB_2 and client access point AP_2 are associated with the same VVM client application, database server DB_2 may include the telephone number associated with client access point AP_2.

Database server DB_2 may generate a response to the request, from notification server N_2, that indicates that database server DB_2 either stores the telephone number (e.g., YES) or does not store the telephone number (e.g., NO). Database server DB_2 may send the response to notification server N_2, as shown as (6B) in FIG. 7.

If notification server N_2 receives a response, from database server DB_2, that indicates that database server DB_2 does not store the telephone number, then notification server N_2 may terminate the synchronization process with regard to client access point AP_2.

If, on the other hand, notification server N_2 receives a response, from database server DB_2, that indicates that database server DB_2 stores the telephone number, then notification server N_2 may send a notification regarding the state change to application server APP_2, as shown as (7B) in FIG. 7. In one implementation, the notification, from notification server N_2, may include information associated with the notification generated by voicemail system VM_2. In one implementation, notification server N_2 may transmit the notification as an XML message to application server APP_2. In another implementation, the notification may be transmitted using a different format.

Application server APP_2 may process the notification and perform an update on database server DB_2, as shown as (8B) in FIG. 7. For example, application server APP_2 may store information regarding the state change in database server DB_2. Application server APP_2 may also send a notification to client access point AP_2, as shown as (9B) in FIG. 7. In one implementation, the notification, from application server APP_2, may include information associated with the notification generated by voicemail system VM_2. In another implementation, the notification, from application server APP_2, may include a confirmation that the transaction was performed. In either event, client access point AP_2 may then update its voicemail information.

With regard to a further one of the synchronization processes, notification server N_2 may perform a database lookup on database server DB_N, as shown as (5C) in FIG. 7. For example, notification server N_2 may send a request, to database server DB_N, regarding whether database server DB_N includes the telephone number associated with client access point AP_2. As described above, database server DB_N may store the telephone number of a client access point 210 to indicate that the corresponding VVM client application is to be synchronized regarding state changes for a voicemail mailbox associated with that client access point 210.

Database server DB_N may generate a response to the request, from notification server N_2, that indicates that database server DB_N either stores the telephone number (e.g., YES) or does not store the telephone number (e.g., NO). Database server DB_N may send the response to notification server N_2, as shown as (6C) in FIG. 7.

If notification server N_2 receives a response, from database server DB_N, that indicates that database server DB_N does not store the telephone number, then notification server N_2 may terminate the synchronization process with regard to client access point AP_N.

If, on the other hand, notification server N_2 receives a response, from database server DB_N, that indicates that database server DB_N stores the telephone number, then notification server N_2 may send a notification regarding the state change to application server APP_N, as shown as (7C) in FIG. 7. In one implementation, the notification, from notification server N_2, may include information associated with the notification generated by voicemail system VM_2. In one implementation, notification server N_2 may transmit the notification as an XML message to application server APP_N. In another implementation, the notification may be transmitted using a different format.

Application server APP_N may process the notification and perform an update on database server DB_N, as shown as (8C) in FIG. 7. For example, application server APP_N may store information regarding the state change in database server DB_N. Application server APP_N may also send a notification to client access point AP_N, as shown as (9C) in FIG. 7. In one implementation, the notification, from application server APP_N, may include information associated with the notification generated by voicemail system VM_2. Client access point AP_N may then update its voicemail information based on the information received from application server APP_N.

In a different implementation than illustrated in FIG. 7, voicemail system VM_2 may generate the simple notification. In this case, application servers 330 may prefetch information from voicemail system VM_2, such as voicemail message headers of the voicemail messages stored in the voicemail mailbox of voicemail system VM_2, and provide some or all of the prefetched information to client access points 210, as described above with regard to FIG. 6B.

Figure 8:
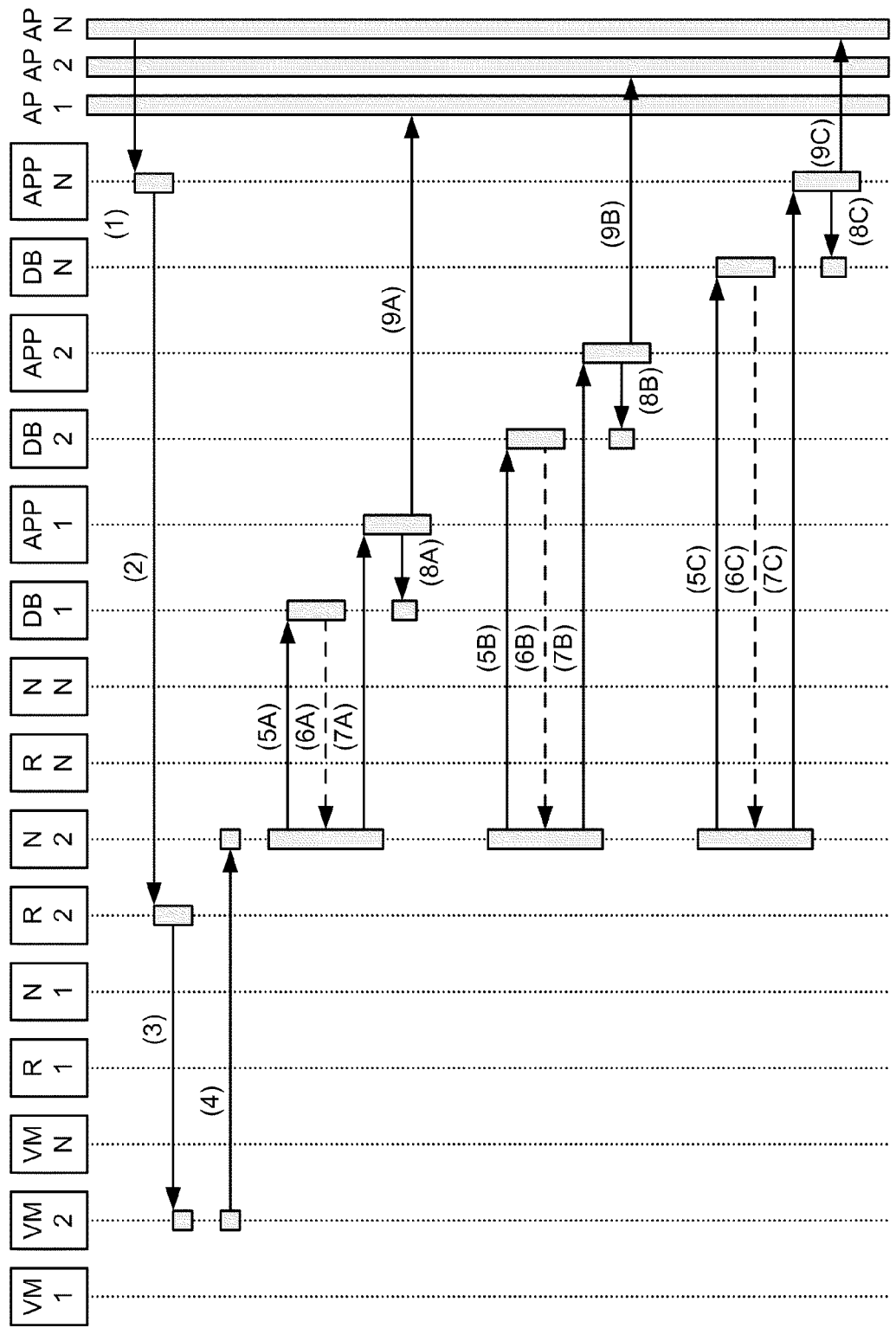
FIG. 8 is a diagram of an exemplary call flow for synchronizing client access points when a client access point performs a change to a voicemail mailbox of a voicemail system associated with a different VVM client application system.

FIG. 8 is a diagram of an exemplary call flow for synchronizing client access points 210 when a client access point 210 performs a change to a voicemail mailbox of a voicemail system 220 associated with a different VVM client application system 230. As shown in FIG. 8, assume that the exemplary call flow occurs in environment 200 and includes voicemail systems 220: VM_1, VM_2, and VM_N; retrieval servers 320: R_1, R_2, and R_N; notification servers 310: N_1, N_2, and N_N; database servers 340: DB_1, DB_2, DB_N; application servers 330: APP_1, APP_2, and APP_N; and client access points 210: AP_1, AP_2, and AP_N.

A user may request, via client access point AP_N, that a transaction be performed on a voicemail stored in a voicemail mailbox on voicemail system VM_2. For example, the user may request access to the voicemail, request that the voicemail be saved, request that the voicemail be deleted, etc. Client access point AP_N may send the transaction request to application server APP_N, associated with the same VVM client application as client access point AP_N, as shown as (1) in FIG. 8. In one implementation, the transaction request may include information regarding what the transaction is and/or information regarding the telephone number associated with the voicemail (e.g., in this case, the telephone number associated with client access point AP_2).

Application server APP_N may receive the transaction request and identify the transaction as corresponding to voicemail system VM_2. Application server APP_N may make this determination based, for example, on the telephone number included in the received transaction request. Application server APP_N may send a transaction request to retrieval server R_2, associated with the VVM client application of voicemail system VM_2, as shown as (2) in FIG. 8. In one implementation, the transaction request, from application server APP_N, may include information regarding what the transaction is and/or information regarding the telephone number associated with client access point AP_2.

Retrieval server R_2 may receive the transaction request and identify the transaction as corresponding to voicemail system VM_2. Retrieval server R_2 may make this determination based, for example, on the telephone number included in the received transaction request. Retrieval server R_2 may send a transaction request to voicemail system VM_2, as shown as (3) in FIG. 8. In one implementation, the transaction request, from retrieval server R_2, may include information regarding what the transaction is and/or information regarding the telephone number associated with client access point AP_2.

Voicemail system VM_2 may receive the transaction request and identify the appropriate voicemail mailbox based, for example, on the telephone number included in the received transaction request. Voicemail system VM_2 may perform the transaction on the voicemail stored in the identified voicemail mailbox, which may result in a state change with regard to the voicemail mailbox. Voicemail system VM_2 may generate a notification regarding the state change and send the notification to notification server N_2, as shown as (4) in FIG. 8. In one implementation, a simple notification, from voicemail system VM_2, may include information identifying the telephone number associated with the voicemail mailbox (e.g., in this case, the telephone number associated with client access point AP_2). A more detailed notification may include, in addition to the telephone number associated with the voicemail mailbox, information regarding what transaction was performed (e.g., what the transaction was (e.g., a new voicemail (or a new facsimile, video, or text message), a save transaction, a delete transaction, an access transaction, a PIN change, or a mailbox setting change)), information regarding what voicemail the transaction was performed on (if applicable), and/or other information that may be useful in synchronizing client access points 210 (e.g., a timestamp associated with the transaction, etc.). The process of FIG. 8 illustrates the situation where voicemail system VM_2 generates the more detailed notification. Voicemail system VM_2 may transmit the notification as an XML message to notification server N_2. Alternatively, the notification may be transmitted using a different format.

Notification server N_2 may process the notification and determine that the notification may need to be provided to one or more VVM client applications. In parallel, notification server N_2 may initiate synchronization processes for synchronizing client access points AP_1, AP_2, and AP_N so that client access points AP_1, AP_2, and AP_N have a same view of the state of the voicemail mailbox in voicemail system VM_2. In one implementation, the synchronization processes may be the same for client access points AP_1, AP_2, and AP_N. In another implementation, one or more of the synchronization processes may differ. In yet another implementation, one of the synchronization processes may not be performed. For example, notification server N_2 may not need to synchronize client access point AP_N because client access point AP_N initiated the transaction and, thus, client access point AP_N is already synchronized.

With regard to one of the synchronization processes, notification server N_2 may perform a database lookup on database server DB_1, as shown as (5A) in FIG. 8. For example, notification server N_2 may send a request, to database server DB_1, regarding whether database server DB_1 includes the telephone number associated with client access point AP_2. As described above, database server DB_1 may store the telephone number of a client access point 210 to indicate that the corresponding VVM client application is to be synchronized regarding state changes for a voicemail mailbox associated with that client access point 210.

Database server DB_1 may generate a response to the request, from notification server N_2, that indicates that database server DB_1 either stores the telephone number (e.g., YES) or does not store the telephone number (e.g., NO). Database server DB_1 may send the response to notification server N_2, as shown as (6A) in FIG. 8.

If notification server N_2 receives a response, from database server DB_1, that indicates that database server DB_1 does not store the telephone number, then notification server N_2 may terminate the synchronization process with regard to client access point AP_1.

If, on the other hand, notification server N_2 receives a response, from database server DB_1, that indicates that database server DB_1 stores the telephone number, then notification server N_2 may send a notification regarding the state change to application server APP_1, as shown as (7A) in FIG. 8. In one implementation, the notification, from notification server N_2, may include information associated with the notification generated by voicemail system VM_2. In one implementation, notification server N_2 may transmit the notification as an XML message to application server APP_1. In another implementation, the notification may be transmitted using a different format.

Application server APP_1 may process the notification and perform an update on database server DB_1, as shown as (8A) in FIG. 8. For example, application server APP_1 may store information regarding the state change in database server DB_1. Application server APP_1 may also send a notification to client access point AP_1, as shown as (9A) in FIG. 8. In one implementation, the notification, from application server APP_1, may include information associated with the notification generated by voicemail system VM_2. Client access point AP_1 may then update its voicemail information based on the information received from application server APP_1.

With regard to another one of the synchronization processes, notification server N_2 may perform a database lookup on database server DB_2, as shown as (5B) in FIG. 8. For example, notification server N_2 may send a request, to database server DB_2, regarding whether database server DB_2 includes the telephone number associated with client access point AP_2. As described above, database server DB_2 may store the telephone number of a client access point 210 to indicate that the corresponding VVM client application is to be synchronized regarding state changes for a voicemail mailbox associated with that client access point 210. In this case, since database server DB_2 and client access point AP_2 are associated with the same VVM client application, database server DB_2 may include the telephone number associated with client access point AP_2.

Database server DB_2 may generate a response to the request, from notification server N_2, that indicates that database server DB_2 either stores the telephone number (e.g., YES) or does not store the telephone number (e.g., NO). Database server DB_2 may send the response to notification server N_2, as shown as (6B) in FIG. 8.

If notification server N_2 receives a response, from database server DB_2, that indicates that database server DB_2 does not store the telephone number, then notification server N_2 may terminate the synchronization process with regard to client access point AP_2.

If, on the other hand, notification server N_2 receives a response, from database server DB_2, that indicates that database server DB_2 stores the telephone number, then notification server N_2 may send a notification regarding the state change to application server APP_2, as shown as (7B) in FIG. 8. In one implementation, the notification, from notification server N_2, may include information associated with the notification generated by voicemail system VM_2. In one implementation, notification server N_2 may transmit the notification as an XML message to application server APP_2. In another implementation, the notification may be transmitted using a different format.

Application server APP_2 may process the notification and perform an update on database server DB_2, as shown as (8B) in FIG. 8. For example, application server APP_2 may store information regarding the state change in database server DB_2. Application server APP_2 may also send a notification to client access point AP_2, as shown as (9B) in FIG. 8. In one implementation, the notification, from application server APP_2, may include associated with the notification generated by voicemail system VM_2. Client access point AP_2 may then update its voicemail information based on the information from APP_2.

With regard to a further one of the synchronization processes, notification server N_2 may also perform a database lookup on database server DB_N, as shown as (5C) in FIG. 8. For example, notification server N_2 may send a request, to database server DB_N, regarding whether database server DB_N includes the telephone number associated with client access point AP_2. As described above, database server DB_N may store the telephone number of a client access point 210 to indicate that the corresponding VVM client application is to be synchronized regarding state changes for a voicemail mailbox associated with that client access point 210.

Database server DB_N may generate a response to the request, from notification server N_2, that indicates that database server DB_N either stores the telephone number (e.g., YES) or does not store the telephone number (e.g., NO). Database server DB_N may send the response to notification server N_2, as shown as (6C) in FIG. 8.

If notification server N_2 receives a response, from database server DB_N, that indicates that database server DB_N does not store the telephone number, then notification server N_2 may terminate the synchronization process with regard to client access point AP_N.

If, on the other hand, notification server N_2 receives a response, from database server DB_N, that indicates that database server DB_N stores the telephone number, then notification server N_2 may send a notification regarding the state change to application server APP_N, as shown as (7C) in FIG. 8. In one implementation, the notification, from notification server N_2, may include information associated with the notification generated by voicemail system VM_2. In one implementation, notification server N_2 may transmit the notification as an XML message to application server APP_N. In another implementation, the notification may be transmitted using a different format.

Application server APP_N may process the notification and perform an update on database server DB_N, as shown as (8C) in FIG. 8. For example, application server APP_N may store information regarding the state change in database server DB_N. Application server APP_N may also send a notification to client access point AP_N, as shown as (9C) in FIG. 8. In one implementation, the notification, from application server APP_N, may include information associated with the notification generated by voicemail system VM_2. In another implementation, the notification, from application server APP_N, may include a confirmation that the transaction was performed. In either event, client access point AP_N may then update its voicemail information.

In a different implementation than illustrated in FIG. 8, voicemail system VM_2 may generate the simple notification. In this case, application servers 330 may prefetch information from voicemail system VM_2, such as voicemail message headers of the voicemail messages stored in the voicemail mailbox of voicemail system VM_2, and provide some or all of the prefetched information to client access points 210, as described above with regard to FIG. 6B.

An implementation, described herein, may synchronize a group of client access points so that the client access points have the same view of voicemail stored by a group of voicemail systems.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIG. 5, the order of the blocks may be modified in other implementations. Further, non-dependent blocks may be performed in parallel.

Also, certain call flows have been described with regard to FIGS. 6A-8. With regard to these call flows, it has been described that an application server 330 may communicate with a retrieval server 320 associated with the same or a different VVM client application. Retrieval server 320 may cause a transaction to be performed on a voicemail system 220 associated with the same VVM client application. In another implementation, an application server 330 may communicate with a retrieval server 320 associated with the same VVM client application. Retrieval server 320 may cause a transaction to be performed on a voicemail system 220 associated with the same or a different VVM client application. Thus, in this implementation, it is retrieval server 320, rather than application server 330, that may communicate across VVM client applications to cause a transaction to be performed.

Further, it has been described that database servers 340 may store telephone numbers of client access points 210 and lookups, based on these telephone numbers, may be performed to determine whether to synchronize a particular client access point 210. In another implementation, another type of identifier, such as another identifier associated with a client access point 210 or an identifier associated with a voicemail system 220, may be used to determine whether to synchronize a particular client access point 210.

Moreover, the term "server," as used herein, is intended to refer to a server device or a server application running on a computing or communication device. It is possible for multiple server applications to be running on a single computing or communication device. It is also possible for a single server application to be running on multiple, possibly distributed computing or communication devices.

Also, synchronization techniques have been described for synchronizing client access points so that the client access points have the same voicemail information. In another implementation, similar synchronization techniques may be used to synchronize client access points with regard to other type of messages, such as facsimile messages, video messages, and/or text messages.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component that performs one or more functions. A component, as used herein, may include hardware, such as an ASIC or FPGA, or a combination of hardware and software (e.g., a processor executing software).

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a plurality of servers connected to a plurality of voicemail systems and a plurality of client access points, the method comprising:
    receiving, by a server of the plurality of servers, notification of a state change relating to a voicemail mailbox of a particular voicemail system of the plurality of voicemail systems; and
    performing, by one or more servers of the plurality of servers, a plurality of synchronization processes, in parallel, to synchronize the plurality of client access points with regard to the state change, where performing one of the plurality of synchronization processes includes:
        determining, by one of the one or more servers, that a memory stores an identifier associated with a first client access point of the plurality of client access points,
        sending, by the one of the one or more servers, information, associated with the state change, to another one of the one or more servers when the memory stores the identifier associated with the first client access point, and
        notifying, by the other one of the one or more servers, a second client access point, of the plurality of client access points, regarding the state change, where the first client access point is different from the second client access point.

2. The method of claim 1, where receiving the notification of the state change includes receiving notification that a new voicemail message has been stored in the voicemail mailbox of the particular voicemail system; and
    where performing the plurality of synchronization processes includes notifying each of the plurality of client access points that the new voicemail message has been stored in the voicemail mailbox of the particular voicemail system.

3. The method of claim 1, where performing the one of the plurality of synchronization processes further includes:
    prefetching, from the particular voicemail system, information regarding voicemail stored in the voicemail mailbox of the particular voicemail system, and
    providing at least a portion of the prefetched information to the second client access point.

4. The method of claim 1, where the state change occurred as a result of a transaction performed with regard to the voicemail mailbox of the particular voicemail system;
    where notifying the second client access point includes sending, to the second client access point, information regarding the transaction that was performed.

5. The method of claim 1, where notifying the second client access point includes sending, to the second client access point, an indication that a transaction was performed with regard to the voicemail mailbox without identifying what the transaction is;
    where performing the one of the plurality of synchronization processes further includes:
        prefetching, from the particular voicemail system, information regarding voicemail stored in the voicemail mailbox of the particular voicemail system, and
        providing at least a portion of the prefetched information to the second client access point.

6. The method of claim 1, where notifying the second client access point includes sending a confirmation to the second client access point, where the confirmation indicates that a transaction, initiated by the second client access point, was successfully performed.

7. The method of claim 1, further comprising:
    receiving, by a server of the plurality of servers, a request to perform a transaction with regard to the voicemail mailbox of the particular voicemail system, where the request is received from the first client access point; and
    causing, by a server of the plurality of servers, the transaction to be performed with regard to the voicemail mailbox of the particular voicemail system, where the particular voicemail system generates the notification of the state change in response to performance of the transaction.

8. The method of claim 1, further comprising:
    receiving, by a server of the plurality of servers, a request to perform a transaction with regard to the voicemail mailbox of the particular voicemail system, where the request is received from a third client access point of the plurality of client access points, where the third client access point is different from the first client access point and the second client access point; and
    causing, by a server of the plurality of servers, the transaction to be performed with regard to the voicemail mailbox of the particular voicemail system, where the particular voicemail system generates the notification of the state change in response to performance of the transaction.

9. A system connected to a plurality of voicemail systems and a plurality of client access points, the system comprising:
    a plurality of servers to:
        receive notification of a state change relating to a voicemail mailbox of a particular voicemail system of the plurality of voicemail systems; and
        perform a plurality of synchronization processes to synchronize the plurality of client access points with regard to the state change,
        where, when performing one of the plurality of synchronization processes, a first set of servers, of the plurality servers, is to:
            determine that a first memory stores an identifier associated with a first client access point of the plurality of client access points, where the voicemail mailbox of the particular voicemail system is also associated with the identifier associated with the first client access point, and
            notify the first client access point regarding the state change when the first memory stores the identifier associated with the first client access point; and
        where, when performing another one of the plurality of synchronization processes, a second set of servers, of the plurality servers, is to:
            determine whether a second memory stores the identifier associated with the first client access point, and
            notify a second client access point, of the plurality of client access points, regarding the state change when the second memory stores the identifier associated with the first client access point.

10. The system of claim 9, where the state change relating to the voicemail mailbox of the particular voicemail system results from storing of a new voicemail in the voicemail mailbox, accessing a voicemail in the voicemail mailbox, deleting a voicemail from the voicemail mailbox, saving a voicemail in the voicemail mailbox, or changing a personal identification number associated with the voicemail mailbox.

11. The system of claim 9, where, when performing the one of the plurality of synchronization processes, the first set of servers is to:
  prefetch, from the particular voicemail system, information regarding voicemail stored in the voicemail mailbox of the particular voicemail system, and
  provide at least a portion of the prefetched information to the first client access point.

12. The system of claim 9, where, when performing the other one of the plurality of synchronization processes, the second set of servers is to:
  prefetch, from the particular voicemail system, information regarding voicemail stored in the voicemail mailbox of the particular voicemail system, and
  provide at least a portion of the prefetched information to the second client access point.

13. The system of claim 9, where the plurality of servers is further to:
  receive a request to perform a transaction with regard to the voicemail mailbox of the particular voicemail system, where the request is received from the first client access point, and
  cause the transaction to be performed with regard to the voicemail mailbox of the particular voicemail system, where the particular voicemail system generates the notification of the state change in response to performance of the transaction.

14. The system of claim 9, where the plurality of servers is further to:
  receive a request to perform a transaction with regard to the voicemail mailbox of the particular voicemail system, where the request is received from a third client access point of the plurality of client access points, and
  cause the transaction to be performed with regard to the voicemail mailbox of the particular voicemail system, where the particular voicemail system generates the notification of the state change in response to performance of the transaction.

15. The system of claim 9, where the state change occurred as a result of a transaction performed with regard to the voicemail mailbox of the particular voicemail system;
  where, when notifying the second client access point, the second set of servers is to send, to the second client access point, information regarding the transaction that was performed.

16. The system of claim 9, where the first set of servers and the second set of servers include at least one server that is common to both the first set of servers and the second set of servers.

17. The system of claim 9, where, when notifying the second client access point, the second set of servers is to send, to the second client access point, an indication that a transaction was performed with regard to the voicemail mailbox without identifying what the transaction is;
  where, when performing the other one of the plurality of synchronization processes, the second set of servers is further to:
    prefetch, from the particular voicemail system, information regarding voicemail stored in the voicemail mailbox of the particular voicemail system, and
    provide at least a portion of the prefetched information to the second client access point.

18. The system of claim 9, where the state change, relating to the voicemail mailbox of the particular voicemail system, resulted from a transaction initiated by the first client access point; and
  where, when notifying the first client access point, the first set of server devices is to send a confirmation to the first client access point, where the confirmation indicates that the transaction was successfully performed.

19. A system associated with a plurality of different voicemail systems, the system connecting to a plurality of voicemail systems and a plurality of client access points, the system comprising:
  a plurality of servers comprising:
    means for receiving a request to perform a transaction relating to a voicemail mailbox of a particular voicemail system of the plurality of voicemail systems;
    means for causing the transaction to be performed with regard to the voicemail mailbox of the particular voicemail system;
    means for receiving a notification that the transaction was performed with regard to the voicemail mailbox of the particular voicemail system; and
    means for performing a plurality of synchronization processes to synchronize the plurality of client access points with regard to the transaction that was performed with regard to the voicemail mailbox of the particular voicemail system, where each of the plurality of client access points contains a same view of the voicemail mailbox as a result of the plurality of synchronization processes.

20. The system of claim 19, where the means for performing a plurality of synchronization processes includes:
  means for performing a first synchronization process of the plurality of synchronization processes, where the means for performing the first synchronization process includes:
    means for determining whether a first memory stores an identifier associated with a first client access point of the plurality of client access points, where the identifier is also associated with the voicemail mailbox of the particular voicemail system, and
    means for notifying the first client access point regarding the transaction that was performed on the voicemail mailbox of the particular voicemail system when the first memory stores the identifier associated with the first client access point; and
  means for performing a second synchronization process of the plurality of synchronization processes, where the means for performing the second synchronization process includes:
    means for determining whether a second memory stores the identifier associated with the first client access point, and
    means for notifying a second client access point, of the plurality of client access points, regarding the transaction that was performed on the voicemail mailbox of the particular voicemail system when the second memory stores the identifier associated with the first client access point.

21. The system of claim 19, where the means for performing the plurality of synchronization processes includes:

means for prefetching, from the particular voicemail system, information regarding voicemail stored in the voicemail mailbox of the particular voicemail system, and means for providing at least a portion of the prefetched information to one or more of the plurality of client access points.

22. The system of claim 19, where the plurality of servers further includes:

means for receiving a notification of a new facsimile message, video message, or text message; and means for notifying the plurality of client access points regarding the new facsimile message, video message, or text message.

\* \* \* \* \*